US012112077B2

(12) United States Patent
Lin et al.

(10) Patent No.: US 12,112,077 B2
(45) Date of Patent: Oct. 8, 2024

(54) FIRST AND SECOND SENSING MODALITY DETECT USER IN FIRST AND SECOND COMMUNICATION RANGE, AND TOUCHLESS AUTOMATIC CONFIGURATION OF PRINT SYSTEM

(71) Applicant: Xerox Corporation, Norwalk, CT (US)

(72) Inventors: Guo-Yau Lin, The Woodlands, TX (US); Eliud Robles Flores, Rochester, NY (US); Varun Sambhy, Pittsford, NY (US); David R. Stookey, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 2 days.

(21) Appl. No.: 17/806,909

(22) Filed: Jun. 14, 2022

(65) Prior Publication Data

US 2023/0401011 A1     Dec. 14, 2023

(51) Int. Cl.
    *G06F 3/12*         (2006.01)
    *G06F 1/3231*       (2019.01)

(52) U.S. Cl.
    CPC .......... *G06F 3/1204* (2013.01); *G06F 3/1226* (2013.01); *G06F 3/1238* (2013.01); *G06F 3/1254* (2013.01); *G06F 3/1257* (2013.01); *G06F 3/1292* (2013.01); *G06F 1/3231* (2013.01)

(58) Field of Classification Search
    None
    See application file for complete search history.

(56) References Cited

U.S. PATENT DOCUMENTS

| | | | |
|---|---|---|---|
| 9,065,955 B2 | 6/2015 | Baba | |
| 9,600,054 B2 | 3/2017 | Ono et al. | |
| 9,740,447 B1 | 8/2017 | Krishnasamy et al. | |
| 10,375,033 B2 | 8/2019 | Nagarajan et al. | |
| 10,993,185 B2* | 4/2021 | Song | G06F 1/3206 |
| 2008/0261567 A1 | 10/2008 | Robson | |
| 2009/0033984 A1* | 2/2009 | Sahashi | G06F 21/608 358/1.15 |
| 2013/0050741 A1 | 2/2013 | Raja et al. | |
| 2016/0328187 A1* | 11/2016 | Nathani | H04W 64/003 |
| 2018/0004463 A1* | 1/2018 | Masumoto | G06F 3/1222 |
| 2021/0216259 A1 | 7/2021 | Ullmann et al. | |

* cited by examiner

*Primary Examiner* — Haris Sabah
(74) *Attorney, Agent, or Firm* — Fox Rothschild LLP

(57) ABSTRACT

A print configuration system will receive, from a first sensing modality, a first message indicating that a user has entered a first region where a print device is located. The system will access a profile for the user to identify a first configuration task, and it will cause the print device to perform the first configuration task. The system will later receive, from a second sensing modality that is different from the first sensing modality, a second message indicating that the user has entered a second region. The second region includes the print device and is a subset of the first region. In response to receiving the second message, the system will cause the print device to perform a second task that is different from the first configuration task.

22 Claims, 4 Drawing Sheets

FIRST AND SECOND SENSING MODALITY DETECT USER IN FIRST AND SECOND COMMUNICATION RANGE, AND TOUCHLESS AUTOMATIC CONFIGURATION OF PRINT SYSTEM

BACKGROUND

Most workplace environments today include print devices that enable workers to print, scan and/or copy documents. In office environments, workers may submit print jobs to a designated printer, which may be a dedicated network printer or a user-selected printer that the worker may access via a cloud-based print server. In dedicated printing facilities such as print shops, print jobs may be assigned to one or more print devices, each of which performs one or more functions on the print job.

In all such environments, print devices may be shared among multiple operators. In offices, a user may walk up to a printer and select various parameters for a print, scan or copy job using the printer's touch screen or other user interface. However, recent public health concerns have made the use of shared touch screens less desirable to many people. In addition, when the user arrives at the printer, the user may discover that there are jobs ahead of that user's job in the print queue, or the user may find that the printer is in a power-saving or sleep mode and must be re-activated before it will operate. In print shop environments, operators may need to cause a print device to take various setup actions to enable the tasks that the operator wishes to perform. Maintenance personnel also may need to wait for various configuration actions to take place before the worker can begin to implement a repair or preventive maintenance function.

This document describes methods and systems that are directed to addressing at least some of the issues described above.

SUMMARY

This document describes method, system, and computer program product embodiments in which a processor of a print configuration system will receive, from a first sensing modality, a first message with a user identifier for a user of a print device, wherein the first message indicates that the user has entered a first region in which the print device is located. In response to receiving the first message, the system will access a profile for the user to identify a first configuration task, and it will cause the print device to perform the first configuration task. The system will later receive, from a second sensing modality that is different from the first sensing modality, a second message with the user identifier. The second message indicates that the user has entered a second region. The second region includes the print device and is a subset of the first region, such that the second message indicates that the user is closer to the print device than the user was when the first message was received. In response to receiving the second message, the system will cause the print device to perform a second task that is different from the first configuration task.

In some embodiments, the processor may be a component of the print device. In other embodiments, the processor and the memory are components of a server that is in communication with the print device.

In some embodiments, the first sensing modality comprises a global positioning system (GPS) or a Wi-Fi access point, and the first message indicates that a mobile electronic device associated with the user has entered GPS coordinates for the first region or that the mobile electronic device has communicatively connected to a Wi-Fi network to which the print device is also communicatively connected. In such embodiments the second sensing modality also may comprise a different Wi-Fi access point, a short-range communication receiver, a near-field communication receiver, or a camera with a facial recognition system.

In some embodiments, the first configuration task may include one or more of the following: a printer warm-up action; an inkjet priming function; a color calibration procedure; a maintenance check routine; or activation of heating or cooling equipment. The second task may include one or more of the following: unlock the print device; print a test pattern; or cause a display of the print device to output a user interface that is customized to the user In some embodiments, the first configuration task may include one or more of the following: a printer warm-up action; an inkjet priming function; a color calibration procedure; or activating heating or cooling equipment, The second task may include instructions to execute a print job that is associated with the user.

In some embodiments, the first configuration task may include locking the print device, and the second task may include unlocking the print device.

In some embodiments, accessing the profile for the user to identify the first configuration task may include: (i) identifying, in the profile, a role of the user; and (ii) selecting, from a set of candidate configuration tasks, a candidate configuration task that is associated with the role.

In some embodiments, the system may use profile information for the user to identify the print device from multiple print devices in a facility that includes the first region and the second region.

In some embodiments, the second task may be a second configuration task, and if so the system may cause the print device to execute a print job after the second configuration task is complete.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value Additional terms that are relevant to this disclosure are defined at the end of this Detailed Description section.

Figure 1:
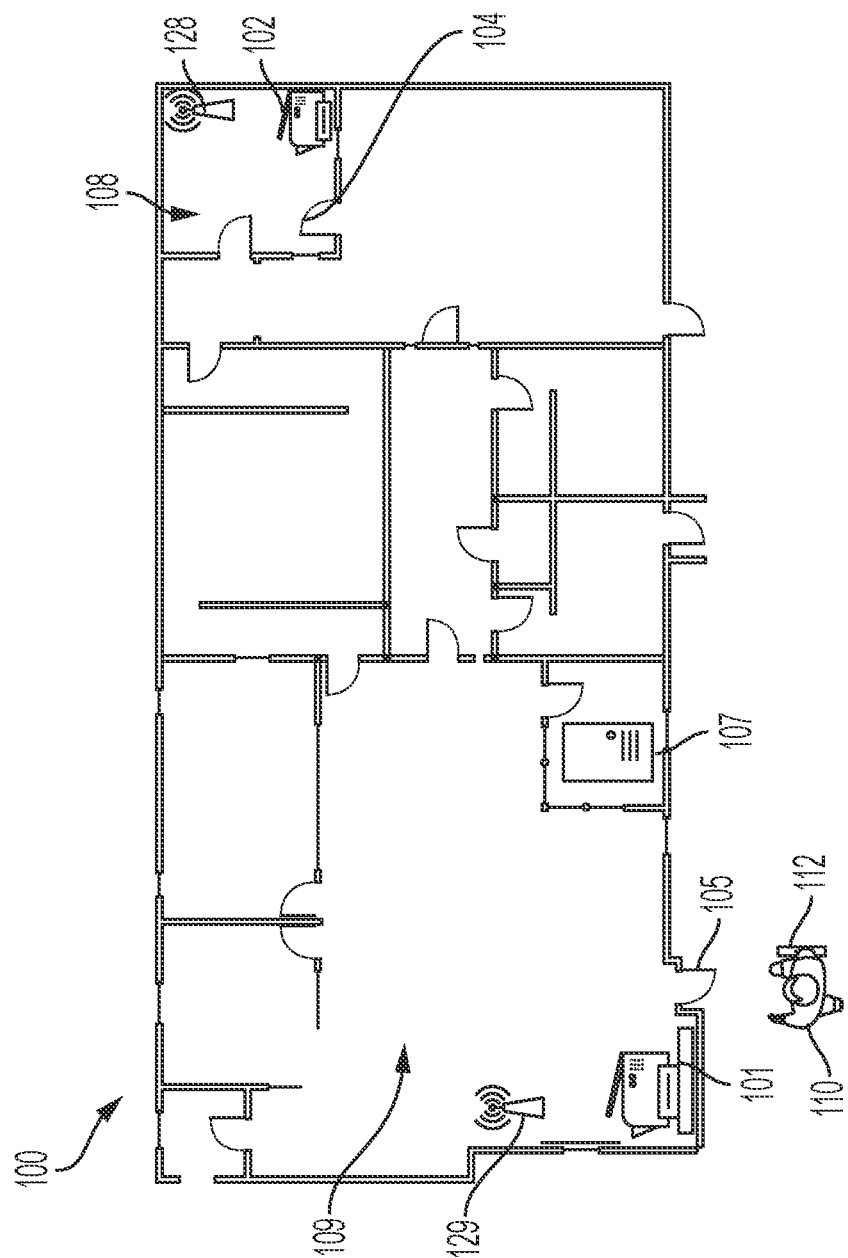
FIG. 1 illustrates an example facility in which multiple print devices are housed and used.

FIG. 1 depicts an example facility 100 in which multiple print devices 101, 102 are housed and used. The facility 100 shown is an office environment having multiple rooms (such as room 108) and corridors (such as corridor 109). However, other types of facilities that contain printers are intended to be covered by this disclosure. Examples of other facility environments include print shops, manufacturing facilities, hotels, public transit facilities, retail stores, conference facilities and other environments that contain print devices. A user 110 is shown entering the facility 100 through an entry portal 105 such as a door as shown. The user 110 may be an operator of one or more of the print devices, a person who has sent a print job to a print server to be printed by a print device, a print device maintenance worker, or another person who will operate one or more of the print devices. The user 110 may be carrying a portable electronic device 112 that contains a transmitter and that can directly or indirectly communicate with the print devices and/or other system components.

Figure 2:
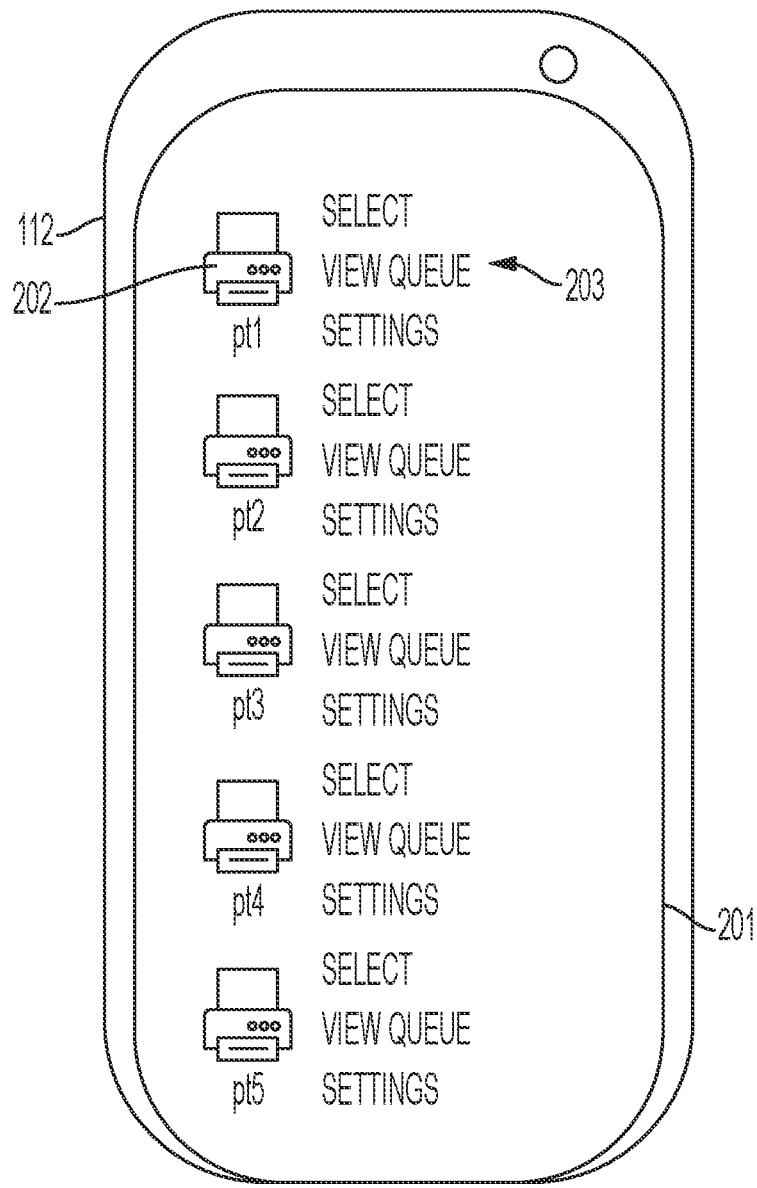
FIG. 2 illustrates an example electronic device with a user interface showing a print system management application.

FIG. 2 illustrates that the portable electronic device 112 may have an installed software application, or a browser application that accesses a remote service, with programming instructions configured to cause a user interface 201 of the device to provide a print system management application. The application may include or have access to print drivers for various printers (such as printer 202) that are available on a network to which the electronic device 112 is communicatively connected. The application also may provide the user access to one or more functions 203 for each print device. Such functions may include functions such as: the ability to select a print device and direct a print job to the device; the ability to view the device's print queue and see how many print jobs are waiting to be printed; and the ability to view and/or modify settings of the device such as black-and-white vs. color operation, single-side or dual-side printing, draft or high-resolution printing, etc.

Returning to FIG. 1, one or more sensing modalities 128, 129 are present at various locations in the facility 100. The sensing modalities 128, 129 may be any electronic device or group of devices equipped with an antenna or other sensor that can detect when the electronic device 112 is in the facility, along with the approximate location of the electronic device within the facility. Sensing modalities 128, 129 may include, but are not limited to, wi-fi access points, short-range or near-field communication receivers (such as those used in Bluetooth or Bluetooth Low-Energy communications), or a group of geolocation beacons that are arranged at various locations in the facility. The sensing modalities 128, 129 may be integral with one or more of the print devices 101, 102, or they may be separate devices. Alternatively or in addition, the sensing modalities 128, 129 may include cameras and face recognition applications that process an image of a user 110 and determine whether the image includes a face of a person who is registered with the system.

In addition, the user electronic device 112, sensing modalities 128, 129 and/or the print devices 101, 102 may communicate with a server 107 that directs print jobs to the print devices. Server 107 may be maintained within the facility 100 as shown, or it may be a remote server that communicates with devices in the facility via a communication network. The server 107 will include one or more computing devices that perform the function of a print server, receiving print jobs and directing the print jobs to designated print devices. The server 107 also may perform the function of an authentication server by requiring the electronic device 112 to present an authentication credential (such as a key or token) as a condition of enabling the user of the electronic device 112 to operate one or more of the print devices.

Figure 3:
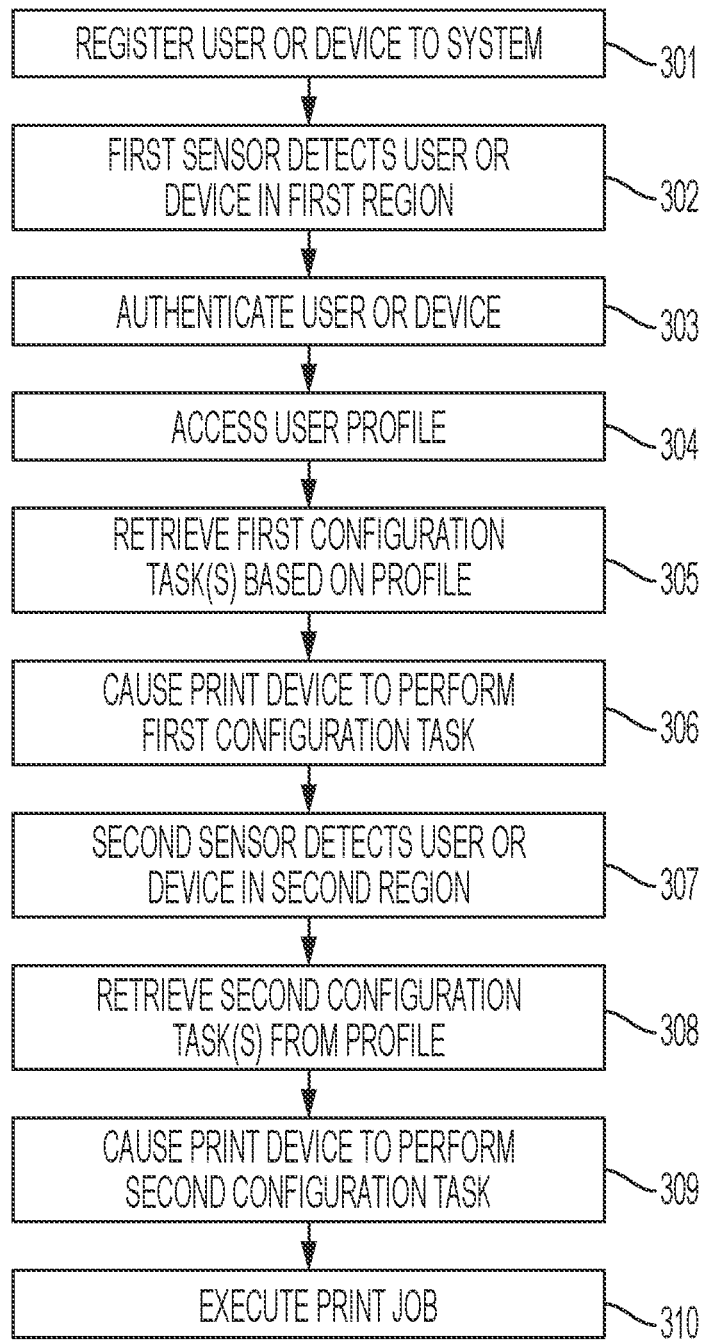
FIG. 3 is a flowchart that illustrates an example workflow by which one or more print devices may perform configuration tasks in response to detecting presence of a user.

FIG. 3 illustrates an example workflow by which one or more print devices may perform certain configuration tasks in response to detecting presence of a user at a location in or near the print device. A print configuration system, which may include processors and memory devices of one or more printers and/or servers, will perform the functions shown. Before a user may use a print device, at 301 the user and/or the user's electronic device must be registered to the system. This can be done by creating a profile, along with a user credential (such as username and password) for the user and storing the profile in a database. The registration process also may include pairing the user's electronic device to one or more of the print devices or other components of the system, such as via a Bluetooth pairing process or other device registration process. Optionally, if the system uses cameras and facial recognition, the system may capture an image of the user's face and store the image and/or image characteristics in the user's profile or in another data set that is associated with the user's profile.

After registration has been complete, at 302 the system may receive, from a first sensing modality in a facility where a print device is located, a first message with a user identifier for a user of a print device. The message indicates that the first user has entered a first region in which the print device is located. The user identifier may be a unique identification code associated with the human user, or a code associated with the user's electronic device. This may be illustrated for example in FIG. 1 in which sensor 129 detects that the user 110 and/or electronic device 112 has entered the facility 100 through portal 105. At 303 the system will authenticate the user and/or the device, such as by examining an authentication token presented by the user's device, or other methods. Other methods may include, without limitation, biometric identification (such as face, fingerprint, voice print or retina matching), or authentication by receipt of an identification device such as a radio frequency identification (RFID) tag, QR code or barcode. Upon detection and authentication, the sensor 129 will send a message to the system indicating that the user 110 has entered the facility.

At 304 the system will access a profile for the user, and it may use the profile to identify and retrieve (at 305) a first configuration task for a print device in the facility. The first configuration task may be included in the profile. Alternatively, the system may select the first configuration task from a data set of candidate tasks in which each candidate task is associated with one or more profile parameters. For example, if the user's profile indicates that the user's role is an administrator or maintenance technician, the system may select a first configuration task that is associated with one of those roles. General users who do not have those roles in their profile would not trigger selection of such a task, but would instead trigger a task that is associated with general users, or a task that is not associated with any user profile restrictions.

Identifying and retrieving the first configuration task at 305 also may include identifying, from multiple print devices in the facility, the print device that should perform the configuration task and subsequently print the print job. This may be done by accessing the user's profile and identifying a print device to which the user is registered, reviewing the print job to identify a print device that the user has selected to perform the print job, or using any other suitable rules. At 306 the system will cause the selected print device to perform the first configuration task.

Then, as the user gets closer to the print device, at 307 a second sensing modality in the facility detects the user or electronic device in a second region of the facility. This may be illustrated for example in FIG. 1, in which sensor 128 detects that the user and/or electronic device has moved through the facility to portal 104 near print device 102. The system and/or sensor generates a message indicating that the user has reached the second region, which is relatively closer than the first region is to print device 102. At this point (or earlier in the process) the system will retrieve a second configuration task for the print device 102. As with the first configuration task, the system may use the user profile data to select the second configuration task from a data set of candidate tasks in which each candidate task is associated with one or more profile parameters. In response to receiving the second message, at 309 the system will cause the print device to perform a second task that is different from the first configuration task.

In the process above, in an example embodiment the first sensing modality may each include a system as a global positioning system (GPS) or a Wi-Fi access point. The first message may indicate that a mobile electronic device associated with the user has entered GPS coordinates for the first region or that the mobile electronic device has communicatively connected to a Wi-Fi network to which the print device is also communicatively connected. The second. The second sensing modality may then include a Wi-Fi access point, a short-range communication receiver, a near-field communication receiver, or camera with a facial recognition system, and the second message may indicate that the user has moved within a communication detection range of the second sensing modality, or otherwise moved closer to the second sensing modality.

The instructions to perform the first configuration task may include instructions for the print device to perform one actions such as: a printer warm-up action; an inkjet priming function; a color calibration procedure; a maintenance check routine; or activation of heating or cooling equipment. The instructions to perform the second task (i.e., when the user has moved relatively closer to the print device) may include instructions to perform one or more of the following: unlock the print device; print a test pattern; cause a display of the print device to output a user interface that is customized to the user; or execute a print job that is associated with the user.

Optionally, the first configuration task may be one that is requires a greater length of time than the second configuration task requires. For example, the first configuration task may comprise color calibration (or another task that may require 3-5 minutes), while the second configuration task may comprise warming up the fuser (or another task that may require 2 minutes or less). In this way, the fuser will not be warmed up but remain idle while the user is still relatively far away from the print device.

In any event, the first configuration task and the second configuration task will be different tasks. In some embodiments, the instructions to cause the print device to perform the first configuration task may include instructions to lock the print device, and the instructions to cause the print device to perform the second task comprise instructions to unlock the print device. In any event, the first configuration task and the second configuration task will be different tasks.

When the second configuration task is complete, and optionally when a third sensing modality (such as the print device itself) detects when the user has reached the print device, at 310 the system may cause the print device to execute the print job.

Figure 4:
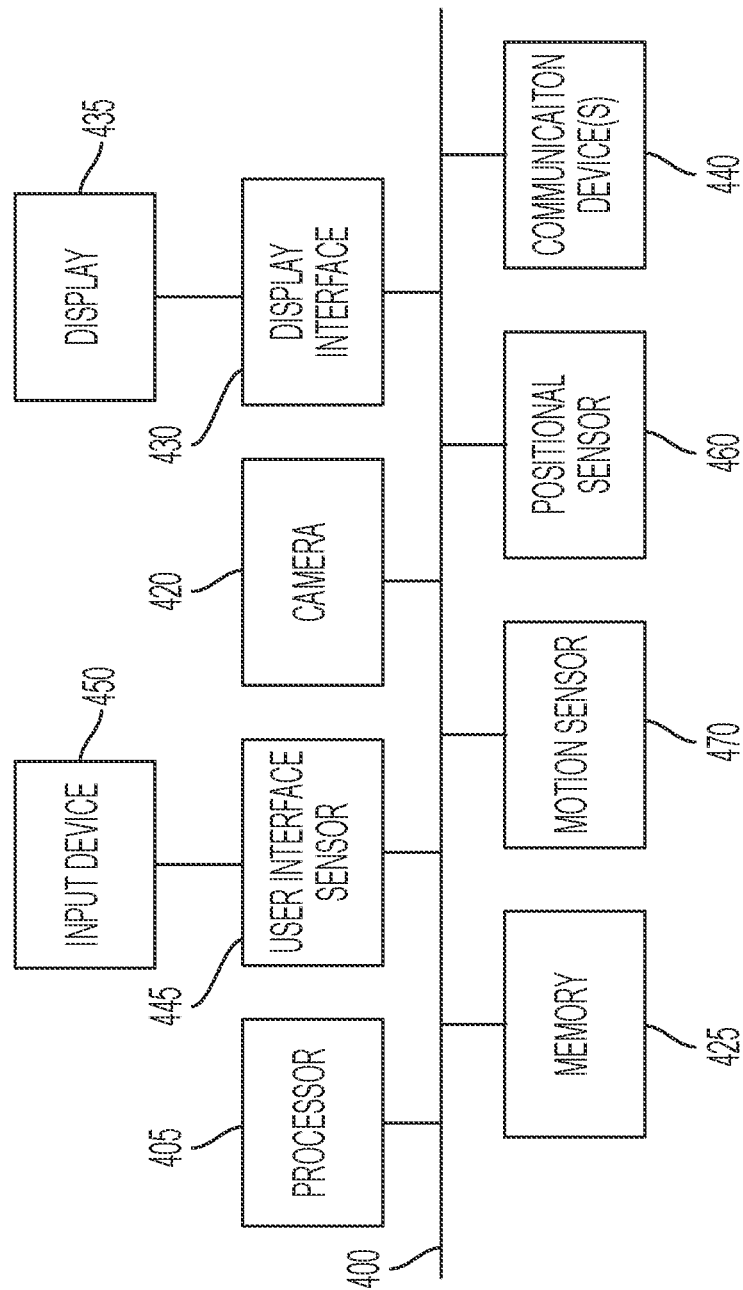
FIG. 4 illustrates example components of electronic devices that may be used with the system and/or implement the methods described in this document.

FIG. 4 depicts an example of internal hardware that may be included in any of the electronic components of the system, such as the user electronic device 112 or server 107 shown in FIG. 1, as well as one or more of the print devices. An electrical bus 400 serves as an information highway interconnecting the other illustrated components of the hardware. Processor 405 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 425. A memory device may include a single device or a collection of devices across which data and/or instructions are stored.

An optional display interface 430 may permit information transmitted along the bus 400 to be displayed on a display device 435 in visual, graphic or alphanumeric format. An audio interface and audio output (such as a speaker) also may be provided. Communication with external devices may occur using various communication devices 440 such as a wireless antenna, an RFID tag and/or short-range or near-field communication transceiver, each of which may optionally communicatively connect with other components of the device via one or more communication systems. The communication device 440 may be configured to be communicatively connected to a communications network, such as the Internet, a local area network or a cellular telephone data network.

The hardware may also include a user interface sensor 545 that allows for receipt of data from input devices 450 such as a keyboard, a mouse, a joystick, a touchscreen, a touch pad, a remote control, a pointing device and/or microphone. Digital image frames also may be received from a camera 420 that can capture video and/or still images. The system also may include a positional sensor 460 and/or motion sensor 470 to detect position and movement of the device. Examples of motion sensors 470 include gyroscopes or accelerometers. Examples of positional sensors 480 include a global positioning system (GPS) sensor device that receives positional data from an external GPS network.

Terminology that is relevant to this disclosure includes:

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 4.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

The term "print device" refers to a machine having hardware capable of reading digital data and using the information from the data and associated print instructions to print a physical document on a substrate. In some embodiments, a print device may have additional capabilities such as scanning or faxing and thus may be a multifunction device. Example print devices include traditional printers and multi-function devices, as well as specialized print devices such as ticket printers, sales receipt printers, and the like. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In embodiments that print a 3D object, the print device may be a 3D printer that can use a digital model to successively place layers of build material on a substrate in a configuration that results in a 3D object.

A "print job" is to a job processed by one or more print devices. A print job may be embodied in a set of instructions and/or parameters that are used to guide operation of the print device or devices and thus cause a document to be printed, scanned, copied or otherwise processed.

The term "print shop" refers to an entity that has multiple document production resources, such as printers, cutters, collators and the like. A print shop may be a freestanding entity including one or more print-related devices. Examples include a printing service provider, or it may be a document production group within a corporation or other entity, such as a work area that contains one or more printers.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A print configuration system comprising:
 a print device capable of performing one or more configuration actions;
 a first sensing modality comprising at least one first sensor, the first sensing modality configured to detect when a user of the print device has entered a first region in which the print device is located, the first sensing modality further configured to receive a user identifier;
 a second sensing modality configured to detect when the user has entered a second region in which the print device is located, wherein the second region is a subset of the first region, the second sensing modality further configured to receive a user identifier, wherein the second sensing modality is different than the first sensing modality;
 a third sensing modality configured to detect when the user has reached the print device, wherein the third sensing modality is different than the first and second sensing modalities;
 a processor; and
 a memory containing programming instructions that are configured to instruct the processor to:
  receive, from the first sensing modality, a first message identifying the user of the print device based on the user identifier received by the first sensing modality, wherein the first message indicates that the user has entered the first region in which the print device is located;
  in response to receiving the first message, access a profile for the user identified by the first message to identify a first configuration task, and cause the print device to perform the first configuration task, wherein the first configuration task comprises a printer warm-up action to re-activate the print device from a power-saving or sleep mode;
  after causing the print device to perform the first configuration task, receive, from the second sensing modality that is different from the first sensing modality, a second message identifying the user based on the user identifier received by the second sensing modality, wherein the second message indicates that the user has entered the second region, and wherein the second region includes the print device and is the subset of the first region such that the second message indicates that the user is closer to the print device than the user was when the first message was received; and in response to receiving the second message, cause the print device to perform a second task that is different from the first configuration task;

after causing the print device to perform the second task, receive, from the third sensing modality, an indication that the user has reached the print device from the second region; and in response to receiving the indication that the user has reached the print device, cause the print device to perform a third task that is different from the first configuration task and the second task, wherein the third task comprises causing the print device to execute a print job associated with the user.

2. The system of claim 1, wherein the processor is a component of the print device.

3. The system of claim 1, wherein the processor and the memory are components of a server that is in communication with the print device.

4. The system of claim 1, wherein:
the first sensing modality comprises a global positioning system (GPS) or a Wi-Fi access point, and the first message indicates that a mobile electronic device associated with the user has entered GPS coordinates for the first region or that the mobile electronic device has communicatively connected to a Wi-Fi network to which the print device is also communicatively connected; and
the second sensing modality comprises a Wi-Fi access point, a short-range communication receiver, a near-field communication receiver, or camera with a facial recognition system.

5. The system of claim 1, wherein:
the instructions to cause the print device to perform the first configuration task comprise instructions to perform one or more of the following: an inkjet priming function; a color calibration procedure; a maintenance check routine; or activation of heating or cooling equipment.

6. The system of claim 1, wherein:
the instructions to cause the print device to perform the first configuration task comprise instructions to perform one or more of the following: an inkjet priming function; a color calibration procedure; or activating heating or cooling equipment.

7. The system of claim 1, wherein:
the instructions to cause the print device to perform the first configuration task comprise instructions to lock the print device; and
the instructions to cause the print device to perform the second task comprise instructions to unlock the print device.

8. The system of claim 1, wherein the instructions to access the profile for the user to identify the first configuration task comprise:
identifying, in the profile, a role of the user; and
selecting, from a set of candidate configuration tasks, a candidate configuration task that is associated with the role.

9. The system of claim 1, further comprising programming instructions that are configured to cause the processor to identify the print device from multiple print devices in a facility that includes the first region and the second region, based on profile information for the user.

10. The system of claim 1, wherein:
the second task is a second configuration task; and
the system further comprises programming instructions that are configured to cause the print device to execute a print job after the second configuration task is complete.

11. The print configuration system of claim 1, wherein:
the print device comprises a machine having hardware capable of printing a physical document on a substrate; and
the instructions that are configured to cause the print device to perform the first configuration task comprise instructions that are configured to cause the hardware to perform the first configuration task.

12. A method of configuring a print device, the method comprising, by a processor:
receiving, from a first sensing modality comprising at least one first sensor and configured to receive a user identifier when a user of a print device has entered a first region in which the print device is located, a first message, wherein the first message indicates that the first sensing modality has detected that the user has entered the first region in which the print device is located;
in response to receiving the first message, accessing a profile for the user identified by the first message to identify a first configuration task, and causing the print device to perform the first configuration task, wherein the first configuration task comprises a printer warm-up action to re-activate the print device from a power-saving or sleep mode;
after causing the print device to perform the first configuration task, receiving, from a second sensing modality that is different from the first sensing modality configured to receive a user identifier when the user has entered a second region in which the print device is located, a second message identifying the user based on the user identifier received by the second sensing modality, wherein the second message indicates that the user has entered the second region, wherein the second region includes the print device and is a subset of the first region such that the second message indicates that the user is closer to the print device than the user was when the first message was received; and
in response to receiving the second message, causing the print device to perform a second task that is different from the first configuration task, wherein the second task comprises causing a display of the print device to output a user interface that is customized to the user;
after causing the print device to perform the second task, receiving, from a third sensing modality that is different from the first and second sensing modalities, an indication that the user has reached the print device from the second region; and
in response to receiving the indication that the user has reached the print device, causing the print device to perform a third task that is different from the first configuration task and the second task, wherein the third task comprises causing the print device to execute a print job associated with the user.

13. The method of claim 12, wherein the processor is a component of the print device or a component of a server that is in communication with the print device.

14. The method of claim 12, wherein:
the first sensing modality comprises a global positioning system (GPS) or a Wi-Fi access point, and the first message indicates that a mobile electronic device associated with the user has entered GPS coordinates for the first region or that the mobile electronic device has communicatively connected to a Wi-Fi network to which the print device is also communicatively connected; and
the second sensing modality comprises a Wi-Fi access point, a short-range communication receiver, a near-field communication receiver, or camera with a facial recognition system.

15. The method of claim 12, wherein:
the first configuration task comprises performing one or more of the following: an inkjet priming function; a color calibration procedure; a maintenance check routine; or activation of heating or cooling equipment.

16. The method of claim 12, wherein:
the first configuration task comprises performing one or more of the following: an inkjet priming function; a color calibration procedure; or activating heating or cooling equipment.

17. The method of claim 12, wherein:
the first configuration task comprises locking the print device; and
the second task comprises unlocking the print device.

18. The method of claim 12, wherein accessing the profile for the user to identify the first configuration task comprises:
identifying, in the profile, a role of the user; and
selecting, from a set of candidate configuration tasks, a candidate configuration task that is associated with the role.

19. The method of claim 12, further comprising identifying the print device from multiple print devices in a facility that includes the first region and the second region, based on profile information for the user.

20. The method of claim 12, wherein:
the second task is a second configuration task; and
the method further includes executing a print job after the second configuration task is complete.

21. A computer program product comprising a memory device and programming instructions that are configured to cause a processor to:
in response to receiving, from a first sensing modality comprising at least one first sensor and configured to receive a user identifier when a user of a print device has entered a first region in which the print device is located, a first message, wherein the first message indicates that the first sensing modality has detected that the user has entered the first region in which the print device is located:
accessing a profile for the user identified by the first message to identify a first configuration task, and causing the print device to perform the first configuration task,
wherein the first configuration task comprises a printer warm-up action to re-activate the print device from a power-saving or sleep mode; and
in response to receiving, from a second sensing modality that is different from the first sensing modality and configured to receive a user identifier when the user has entered a second region in which the print device is located, a second message identifying the user based on the user identifier received by the second sensing modality, wherein the second message indicates that the user has entered the second region, and wherein the second region includes the print device and is a subset of the first region such that the second message indicates that the user is closer to the print device than the user was when the first message was received:
causing the print device to perform a second task that is different from the first configuration task;
after causing the print device to perform the second task, receiving, from a third sensing modality that is different from the first and second sensing modalities, an indication that the user has reached the print device from the second region; and
in response to receiving the indication that the user has reached the print device, causing the print device to perform a third task that is different from the first configuration task and the second task, wherein the third task comprises causing the print device to execute a print job associated with the user.

22. The computer program product of claim 21, wherein:
the user identifier received by the first sensing modality is a unique identification code associated with the human user or a code associated with the user's electronic device;
the user identifier received by the second sensing modality is a unique identification code associated with the human user or a code associated with the user's electronic device;
the user identifier received by the first sensing modality is different than the user identifier received by the second sensing modality; and
the user identifier received by the first sensing modality and the user identifier received by the second sensing modality both identify the same user.

* * * * *